(12) United States Patent
Meyer et al.

(10) Patent No.: US 7,897,911 B2
(45) Date of Patent: Mar. 1, 2011

(54) OPTOELECTRONIC SENSOR ARRANGEMENT AND PROCESS FOR MONITORING A SURVEILLANCE AREA

(75) Inventors: Christoph Meyer, Gutach (DE); Martin Wuestefeld, Sexau (DE); Olaf Henkel, Reute (DE)

(73) Assignee: Sick AG, Waldkirch (DE)

( * ) Notice: Subject to any disclaimer, the term of this patent is extended or adjusted under 35 U.S.C. 154(b) by 444 days.

(21) Appl. No.: 12/153,051

(22) Filed: May 13, 2008

(65) Prior Publication Data

US 2008/0284594 A1 Nov. 20, 2008

(30) Foreign Application Priority Data

May 16, 2007 (DE) .................. 10 2007 023 101

(51) Int. Cl.
*G06M 7/00* (2006.01)
(52) U.S. Cl. ..................... 250/221; 250/222.1
(58) Field of Classification Search ................. 250/221, 250/222.1
See application file for complete search history.

(56) References Cited

U.S. PATENT DOCUMENTS

| | | | | |
|---|---|---|---|---|
| 5,319,201 A * | 6/1994 | Lee | ............... | 250/349 |
| 5,396,070 A * | 3/1995 | Lee | ............... | 250/349 |
| 5,726,443 A * | 3/1998 | Immega et al. | ............ | 250/227.2 |
| 6,124,586 A * | 9/2000 | De Coi | ............ | 250/221 |
| 7,326,914 B2 * | 2/2008 | Pirkl | ............ | 250/221 |
| 7,372,011 B2 * | 5/2008 | Green et al. | ............ | 250/214 R |
| 7,579,580 B2 * | 8/2009 | Halter | ............ | 250/222.1 |
| 7,777,175 B2 * | 8/2010 | Arnold et al. | ............ | 250/221 |
| 7,786,425 B2 * | 8/2010 | Arnold | ............ | 250/221 |
| 2005/0133702 A1 * | 6/2005 | Meyer | ............ | 250/221 |
| 2006/0049339 A1 * | 3/2006 | Green et al. | ............ | 250/221 |
| 2006/0278817 A1 * | 12/2006 | Pirkl | ............ | 250/221 |
| 2006/0278818 A1 * | 12/2006 | Green et al. | ............ | 250/221 |
| 2008/0284594 A1 * | 11/2008 | Meyer et al. | ............ | 340/541 |
| 2009/0152451 A1 * | 6/2009 | Arnold et al. | ............ | 250/227.22 |

FOREIGN PATENT DOCUMENTS

| | | |
|---|---|---|
| DE | 43 38 978 C2 | 5/1998 |
| DE | 197 18 390 A1 | 11/1998 |
| DE | 101 14 784 A1 | 10/2002 |
| DE | 101 26 086 A1 | 12/2002 |
| DE | 199 07 548 C2 | 8/2003 |
| DE | 103 27 388 A1 | 1/2005 |
| DE | 10 2005 008 085 A1 | 8/2006 |
| EP | 0 658 718 B1 | 6/1995 |
| EP | 1 159 636 B1 | 12/2001 |
| EP | 1 246 148 A2 | 10/2002 |
| EP | 1 437 542 B1 | 7/2004 |
| EP | 1 544 643 A1 | 6/2005 |

* cited by examiner

*Primary Examiner*—John R Lee
(74) *Attorney, Agent, or Firm*—The Nath Law Group; Jerald L. Meyer; Stanley N. Protigal

(57) ABSTRACT

An optoelectronic sensor arrangement (1), with a plurality of optical transmitters (21, 22) positioned side by side in an optical transmitter strip (12), such that each optical transmitter (21, 22) transmits the light of a transmitted cone ($\alpha 1, \alpha 2$) into a surveillance area (50), and with a plurality of optical receivers (31, 32) positioned side by side in an optical receiver strip (14), which optical receivers (31, 32) receive the light of a received cone ($\beta 1, \beta 2$) from the surveillance area (50), where each receiver (31, 32) comprises a spatially-resolving element (41, 42), such that each optical transmitter (21, 22) and optical receiver (31, 32) form an optical receiver/transmitter pair, and a control unit contains means for determining the optical incident point (L1, L1', L2, L3) on one of the optical receivers (31, 32) of the transmitted cone ($\alpha 1, \alpha 2$) of each optical transmitter (21, 22) and/or of a foreign light source (G1).

19 Claims, 5 Drawing Sheets

OPTOELECTRONIC SENSOR ARRANGEMENT AND PROCESS FOR MONITORING A SURVEILLANCE AREA

BACKGROUND

The present disclosure relates to an optoelectronic sensor arrangement, with a plurality optical transmitters positioned to transmit light into a surveillance area, and receivers to receive the light of a received cone from the surveillance area, and to a process for monitoring a surveillance area.

Known to the prior art are optoelectronic sensor arrangements having a plurality of optical transmitters that are positioned side by side on an optical transmitter strip, such that each optical transmitter emits light in a transmitted cone that irradiates a surveillance area, and having a plurality of optical receivers on an optical receiver strip which receive the light of a cone received from the surveillance area and which are designed as laterally-resolving optical receivers, such that each optical transmitter and its corresponding optical receiver form an optical receiver/transmitter pair.

Optoelectronic sensors arrangements of this kind can be used, e.g., in security equipment that monitors facilities or machines that execute dangerous movements, or that monitor automation machinery and conveyor paths.

The purpose of the optoelectronic arrangement is to determine whether an object is moving in a danger zone, so that the movement executed by equipment or machinery can be stopped, if necessary, or at least reduced in speed; or to determine whether certain objects are being transported along the conveyor paths and automation facilities in the desired fashion.

It is known to design the optoelectronic sensor arrangement both as a one-way light grid, where that the optical transmitter strip and the optical receiver strip are located on opposite sides of the surveillance area, and as a reflective light grid, such that the optical transmitter strip and the optical receiver strip are positioned in adjacent fashion on one side of the surveillance area, while a reflector is positioned opposite them in order to reflect the light emitted by optical transmitters to the optical receivers.

In both cases an object that has penetrated the surveillance area interrupts the light path between the optical transmitter and the optical receiver, so that an appropriate signal can be emitted by the optoelectronic sensor arrangement, with the result that, e.g., an alarm is triggered or machines and equipment can be stopped.

To insure the reliable functioning of the optoelectronic sensor arrangement, even when subjected to jolts or a vibrational load, the optical transmitters as a rule emit light in the form of a widening cone, while the optical receivers as a rule are able to receive light that strikes them from the cone.

An optoelectronic sensor with a plurality of optical transmitter/receiver pairs, such that the optical receivers are designed as spatially-resolving receivers, is described, e.g., by DE 197 18 390A 1. In this optoelectronic sensor the focal point of the received light is determined for each spatially-resolving receiver and is compared with a reference value. Based on the focal point of the received light and on deviations from the reference value, it is possible, e.g., to determine whether an object in the surveillance area has been reflected. However, a disadvantage here rests in the fact that as soon as different optical sources irradiate the receiver, the focal point of the received light represents only the superimposed signal of the different light sources. Under certain circumstances, reflections of objects that have penetrated the surveillance area cannot be identified, so that it is impossible to identify the object that has impermissibly entered the surveillance area.

BRIEF DESCRIPTION OF THE DRAWINGS

The disclosed techniques are described in greater detail on the basis of the following figures. Shown are.

DETAILED DESCRIPTION

Figure 1:
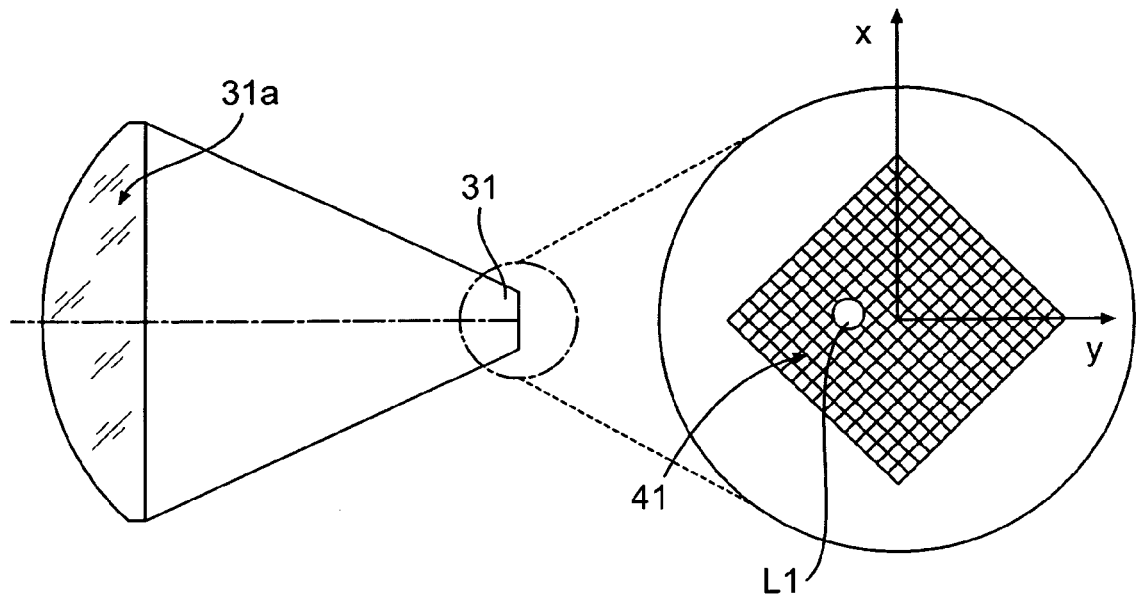
FIG. 1 a schematic depiction of an optical receiver, with a lens system and an enlarged section FIG. 2 a schematic depiction of an optical transmitter strip, in which the spatial axes are defined FIG. 3 a schematic depiction of an optoelectronic sensor arrangement, showing optimal alignment FIG. 4 a schematic depiction of an optoelectronic sensor arrangement in accordance with FIG. 3, with an optical receiver strip improperly twisted around the X-axis FIG. 5 a schematic depiction of an optoelectronic sensor arrangement in accordance with FIG. 3, with an optical receiver strip improperly twisted around the Y-axis FIG. 6 a schematic depiction the optical receiver strip of the optoelectronic sensor arrangement of FIG. 3, with improper twisting around the Z-axis FIG. 7 a schematic depiction of an optoelectronic sensor arrangement in accordance with FIG. 3, with improperly twisted installation of the optical receiver strip FIG. 8 the optoelectronic sensor arrangement in accordance with FIG. 3, with schematic depiction of the distance calculation between the optical transmitter strip and the optical receiver strip FIG. 9 the optoelectronic sensor arrangement in accordance with FIG. 3, with a permissible object in the surveillance area FIG. 10 the optoelectronic sensor arrangement in accordance with FIG. 3, with a permissible and impermissible object in the surveillance area.

A goal, therefore, is to provide an optoelectronic sensor arrangement by means of which such reflections can be identified in a particularly reliable manner. In addition, a corresponding process for monitoring the surveillance must be specified.

The optoelectronic sensor according to DE 197 18 390 A1 has the capability of identifying a misalignment as based on the uniform displacement of the focal points of the received light. However, since the focal point of the received light may represent a superimposition of light from different light sources, the identification of a misalignment by this process may be faulty, as may be the subsequent adjustment of the optical transmitters relative the optical receivers.

A goal, therefore, is to provide an optoelectronic sensor arrangement in which the transmitter strip can be as precisely aligned as possible with the receiver strip, and to provide a corresponding process.

In many applications, however, it is not sufficient to insure the correct orientation of the transmitter strip to the receiver strip. It is also necessary to determine with a high degree of accuracy the distance between the optical transmitter strip and the optical receiver strip. DE 103 59 782 A1 describes an optoelectronic sensor arrangement with a plurality of optical transmitters positioned in adjacent fashion and a plurality of optical receivers positioned in adjacent fashion, which together form a number of interacting optical transmitter/receiver pairs. In a distance-calculating process the distance between the optical transmitter and the optical receiver is determined from the number of optical transmitters visible to a single optical receiver and/or from the number of optical receivers that 'view' a single optical transmitter. However, this process for determining the distance between the optical transmitters and the optical receivers can only be implemented if there is a large number of optical transmitters positioned in the transmitter strip and a large number of optical receivers positioned in the receiver strip. The process cannot be employed if there are only two optical transmitters in the transmitter strip and only two optical receivers in the receiver strip.

Another goal is to specify an optoelectronic sensor arrangement in which the distance between the optical transmitters and the optical receivers can be determined in a cost-effective manner. A corresponding process must also be specified.

The goals are achieved by an optoelectronic sensor arrangement with a control unit containing means for determining a plurality of optical incident points on one of optical receivers of the transmitted cone of each of one or more optical transmitters and/or from a foreign light source, and by a process in which such optical incident points are determined.

The optoelectronic sensor arrangement has a control unit which contains means for determining the optical point of incidence located on one of the optical receivers of the cone transmitted by any one of the optical transmitters and/or by a foreign light source. Thus the point of incidence of the corresponding light ray, or the transmitted cone, on the optical receiver can be determined in spatially-resolving fashion for each individual light source. Compared with a method that determines the focal point of the received light, this process has an advantage in that it is possible to determine if the light from different light sources strikes the optical receiver. As described below, the invention thus makes possible a more reliable identification of reflections and provides an improved process of alignment and a simplified method for measuring the distance between the optical transmitters and receivers.

Each optical transmitter and each optical receiver can be advantageously controlled by the control unit, independent of the other. The result is that, e.g., different optical transmitter/receiver pairs can be activated in periodic fashion to perform evaluations, or that, e.g., one optical transmitter, but a plurality of the optical receivers, can be activated in order to identify the incident points on the optical receivers for a single transmitter and in order to use those incident points in a related evaluation process.

It is particularly preferred if the spatially-resolving optical receivers consist of a matrix arrangement of photosensitive elements, chiefly a CCD sensor or a CMOS image-processing sensor.

In the inventive process for monitoring a surveillance area, which provides for the measurement of distance between the optical transmitters and the optical receivers, the point of incidence on a first and second optical receiver is ascertained for the cone transmitted by the first optical transmitter, which forms an optical transmitter/receiver pair with the first optical receiver. Thus, only one optical transmitter is activated, and the incident point of the light cone transmitted by this optical transmitter on two different optical receivers is determined. Then the angle of incidence on the second optical receiver is ascertained from the relative positions of the incident points on the two optical receivers. The angle of incidence on the first optical receiver should be roughly 90°, inasmuch as the first optical receiver forms a transmitter/receiver pair with the first optical transmitter. From the angle of incidence and the distance between the two optical receivers it is possible to determine the distance between the first optical receiver and the corresponding optical transmitter. This process can be performed even if there are only two optical transmitters positioned in the optical transmitter strip and only two optical receivers in the optical receiver strip. Thus even for a light grid with relatively small dimensions it is possible to reliably calculate the distance between the optical transmitters and the corresponding optical receivers.

To increase accuracy in calculating the distance between the optical transmitters and the optical receivers, different optical transmitter/receivers pairs can be evaluated in time-staggered fashion. The distance values established for the optical transmitter/receiver pairs can also be averaged in advantageous fashion.

To improve the alignment of the optoelectronic sensor arrangement, a process is specified for monitoring a surveillance area such that the incident point of the cone transmitted by the optical transmitter on the corresponding optical receiver is established in an alignment mode for two of the optical transmitter/receiver pairs, whereupon a conclusion is drawn about the type of misalignment that present, as based on the positions of the incident points on the optical receivers as compared to reference positions that represent an optimal alignment.

In particular, the optical transmitters positioned side by side define an X-axis, just as a Z-axis is defined by the symmetrical axis of the cone transmitted by an optical transmitter, and a Y-axis runs perpendicular to the X-axis and to the Y-axis. When a deviation in the incident points of both light cones transmitted by the optical transmitters arises in the same direction along the X-axis, relative to the reference positions, it can be inferred that the optical receiver strip has been improperly twisted around the Y-axis. When a deviation in the incident points of both light cones transmitted by the optical transmitters arises in opposite directions along the Y-axis, relative to the reference positions, it can be inferred that the optical receiver strip has been improperly twisted around the Z-axis. When a deviation in the incident points of both light cones transmitted by the optical transmitters arises in opposite directions along the X-axis, it can be inferred that the optical receiver strip was improperly twisted upon mounting. Thus, after the relative positions of the incident points on the two optical receivers are compared with the corresponding reference positions, the deviation from the reference position allows a conclusion to be reached on the axis around which the receiver strip must be rotated in order to eliminate the specific misalignment. The result is a particularly simple process for aligning the optical receiver strip relative to the optical transmitter strip.

In this process as well, only two optical transmitter/receiver pairs are required in order to provide the appropriate values. When the optoelectronic sensor arrangement has more than two such pairs, different optical transmitter/receivers pairs that are staggered over time are used to obtain more reliable information and insure an optimized alignment.

In particular, the reference positions can be ascertained by means of a "teach-in" process, e.g., during manufacturing, in which the optical transmitter strip is configured relative to the optical receiver strip, so that the correct alignment can be established and the appropriate optical incident points can be learned.

In a further inventive process for the monitoring of a surveillance area, there is a surveillance mode for each optical transmitter/receiver pair. In this mode the incident point of the light cone transmitted by the optical transmitter on the corresponding optical receiver is ascertained and an examination is made to determine if a second incident point is produced on the same optical receiver, e.g., by a reflection or other source of foreign light. If a second incident point is present on the optical receiver, it can be determined from the position of the incident points on the optical receiver, relative to the pre-established reference positions, if there is a permissible or impermissible reflection or input of foreign light.

Permissible reflections may arise, for example, when highly reflective objects enter the transmission/reception area and produce an additional reflex on the optical receiver. Permissible inputs of foreign light may arise when, e.g., light sources that are present for the purpose of illumination produce an additional optical incident point on the optical receiver. Light components or inputs of this kind can be advantageously ascertained in the 'teach-in' process and stored as reference positions in the control unit.

In particular, optical transmitter/receiver pairs whose operation is staggered in time can be employed to monitor the obtained information through multiple measurements, to thereby increase the security and reliability of the surveillance process.

In a particularly preferred process for monitoring a surveillance area, the distance-calculating mode, the alignment mode, and/or the surveillance mode may be activated in a periodic or in an occasion-specific manner. During continuous operation, this serves to increase reliability through the surveillance mode, particularly in the detection of reflections. It also serves to monitor the alignment at regular intervals and/or to monitor the distance between the optical transmitter strip and the optical receiver strip for the purpose of any needed readjustment.

In its control unit the optoelectronic sensor arrangement advantageously exhibits means to implement the process.

Each of FIGS. 3 to 10 depicts an optoelectronic sensor arrangement 10, which has an optical transmitter strip 12 and an optical receiver strip 14. A plurality of optical transmitters is positioned in the optical transmitter strip 12. For the sake of simplicity, only two of these are schematically depicted, namely optical transmitter 21 and optical transmitter 22. In principle, it is possible for only these two optical transmitters 21, 22 to be positioned in the optical transmitter strip 12. Preferably, however, there will be a greater number, e.g., 100 to 200, positioned side by side in the optical transmitter strip 12. This is suggested by the dots in FIGS. 3 to 8. A plurality of optical receivers is positioned in the optical receiver strip 14. For the sake of simplicity, however, only two are schematically depicted here, namely optical receivers 31, 32. It is possible for these to be positioned in the optical receiver strip 14 by themselves. It is preferred, however, that a greater number of optical receivers, e.g., roughly 100 to 200, will be positioned in the optical receiver strip 14. This is suggested by the dots in FIGS. 3 to 8. In the present case, optical transmitter 21 and optical receiver 31 form an optical transmitter/receiver pair, as do optical transmitter 22 and optical receiver 32.

The optical transmitter strip 12 and the optical receiver strip 13 are positioned on opposite sides of a surveillance area 50 and are so aligned that the light emitted by the optical transmitters 21, 22 passes through the surveillance area 50 and strikes the optical receivers 31, 32.

Optical transmitters 21, 22 transmit light into the surveillance area 50 in a widening light cone α1, α2. The optical receivers receive the light of cones β1, β2 coming to them from the surveillance area 50.

The optical transmitters 31, 32 are each designed as a spatially-resolving element 41, 42, composed of, e.g., a matrix configuration of photosensitive elements, and are designed as, e.g., CCD sensors.

FIG. 1 schematically depicts optical receiver 31 in a longitudinal section, where the sectional enlargement at the right of the figure gives a top view of the spatially-resolving element 41 of the optical receiver 31. The spatially-resolving element 41 has, e.g., a matrix configuration of 16×16 image points. For the sake of simplicity, however, FIGS. 3 to 10 show the spatially-resolving elements 41, 42 with fewer image points, and specifically in the form of a matrix configuration with 8×8 photosensitive elements. As can be seen in FIG. 1, there is positioned in front of the optical receiver 31 a receiving lens 31a which focuses incident light onto the optical receiver 31. The other optical receivers, specifically optical receiver 32, also exhibit a receiving lens, though this is not shown in FIGS. 3 to 10. As a rule, a transmitting lens is positioned in comparable fashion in front of the optical transmitters 21.

Figure 3:
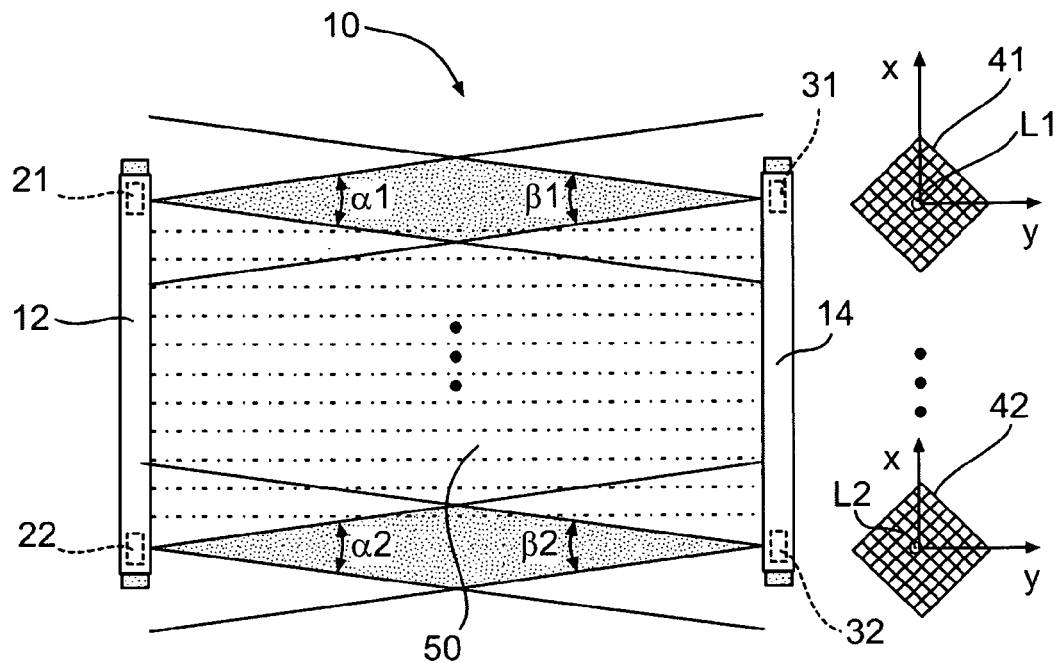

Given an ideal alignment of the optical transmitter strip 12 vis-a-vis the optical receiver strip 14, the optical receivers 31, 32 each detect the light directed at them by the optical transmitters 21, 22. When the alignment here is optimal, the light emitted by optical transmitters 21, 22 in each case produces an incident point L1, L2 on the spatially-resolving elements 41, 42 which lies in the middle of the spatially-resolving element 41, 42. This is shown in FIG. 3. These positions are also specifically designated as reference positions and can be learned by the configuration during a teach-in process. This process is performed, e.g., during manufacture or after successful installation, during which the optical transmitter strip 12 and the optical receiver strip 14 are aligned using other, auxiliary means and the corresponding incident points L1, L2 on the spatially-resolving elements 41, 42 are stored as reference positions.

The optoelectronic sensor arrangement 10 exhibits a control unit (not shown), in which there are means for determining the optical incident point L1, L2 of the transmitted cones α1, α2 of a given optical transmitter 31, 32, or (as may be the case) of a foreign light source, on one of the optical receivers. The optical incident points for various light sources can thus be independently ascertained for each spatially-resolving element 41, 42.

Upon installation of the optoelectronic sensor arrangement 10, the optical transmitter strip 12 and the optical receiver strip 14 must be aligned in such a way that the light of an optical transmitter 21, 22 falls on the corresponding optical receiver 31, 32 of the given optical transmitter/receiver pair.

A corresponding alignment process is next described on the basis of FIGS. 4 to 7.

Figure 2:
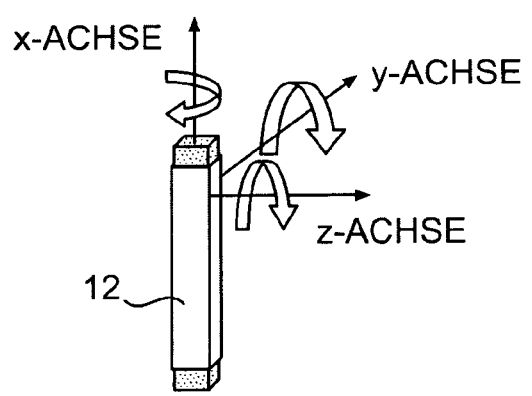

FIG. 2 shows the different axes along which the optical receiver strip 14 must be aligned relative to the optical transmitter strip 12. The X-axis is defined as the axis running in the longitudinal direction of the optical transmitter strip, as determined by the adjacently positioned optical transmitters 21, 22. The Z-axis is defined as the axis of the transmitted cones α1, α2 from the optical transmitters 21, 22 or, as the case may be, of the received cones β1, β2 received by the optical receivers 31, 32. The Y-axis is defined as the axis which runs perpendicular to both the X-axis and the Y-axis. The goal of the alignment process is for the X-and Y-axes of the optical transmitter strip 12 and of the optical receiver strip 14 to run parallel to each other and for the Z-axes of the different optical transmitter/receiver pairs to coincide.

Figure 4:
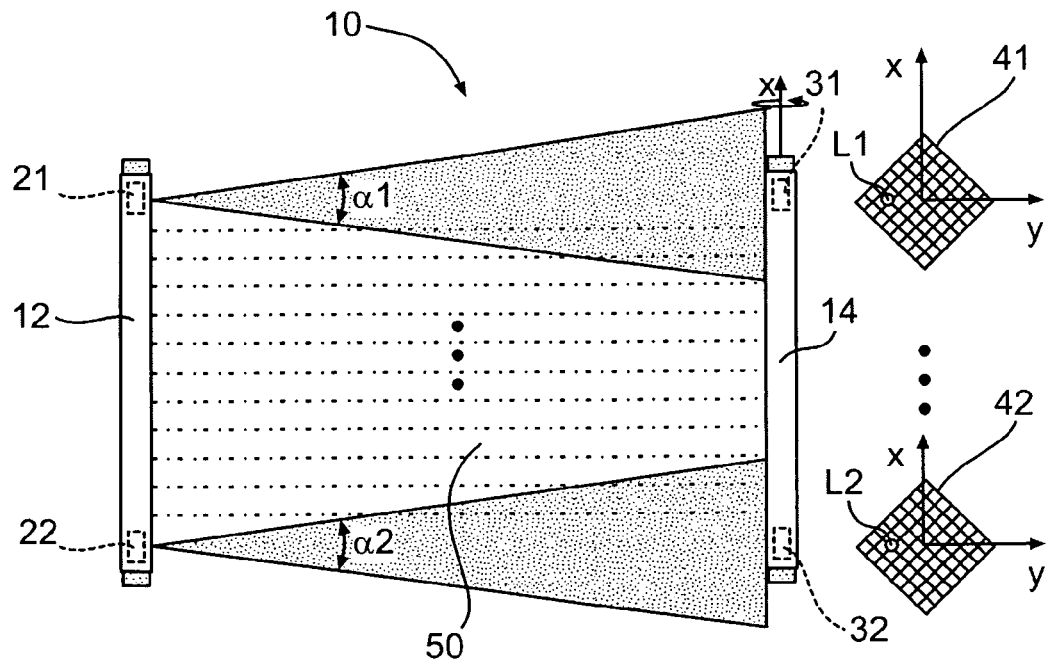

FIG. 4 depicts the optoelectronic sensor arrangement 10 shown in FIG. 3, which differs here in that the optical receiver strip 14 has been improperly twisted around the X-axis. This is revealed by the fact that the optical incident points L1, L2 of the transmitted cones α1, α2 of the optical transmitters 21, 22 have each been shifted in the same direction along the Y-axis on the corresponding spatially-resolving elements 41, 42 of optical receivers 31, 32, relative to the reference positions shown in FIG. 3. If the divergence is identical for both incident points L1, L2, a correct alignment and adjustment can be achieved by rotating the optical receiver strip 14 around the X-axis.

Figure 5:
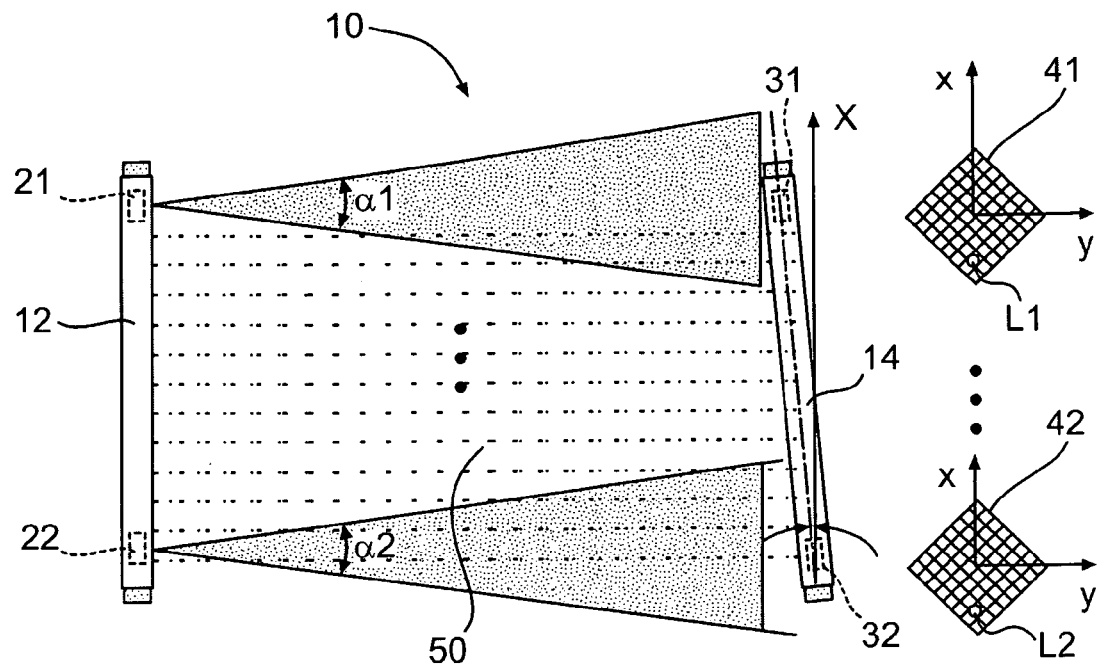

FIG. 5 shows the optoelectronic sensor arrangement 10 of FIG. 3, which differs here in that the optical receiver strip 14 has been improperly twisted around the Y-axis. This is revealed by the deviation of the incident points L1, L2 in the same direction along the X-axis, relative to the reference positions shown in FIG. 3. Based on the position of the incident points L1, L2 relative to the reference positions shown in FIG. 3, a conclusion can be made on the type of rotational displacement that the optical receiver strip 14 has undergone vis-à-vis the desired reference position, and this displacement can be corrected, so that the incident points L1, L2 are moved in the direction of the desired reference position upon rotation around the Y-axis and so that the desired, optimal alignment is achieved.

Figure 6:
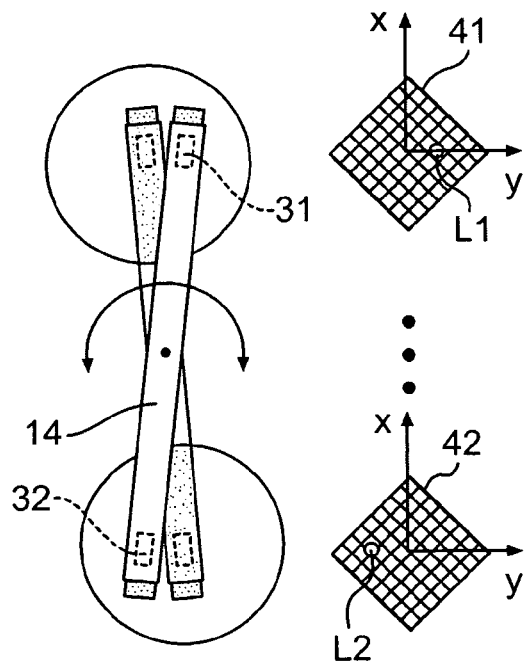

FIG. 6 shows the optoelectronic sensor arrangement 10 of FIG. 3, where the optical receiver strip 14 has been improperly twisted around the Z-axis relative to the optical transmitter strip 12. This is revealed by the fact that the incident point L1 of optical transmitter 21 is displaced in one direction along the Y-axis, while the incident point L2 of optical transmitter 22 is displaced along the Y-axis in the opposite direction. For this kind of deviation of the incident points L1, L2 from the reference positions shown in FIG. 3, a conclusion can again be made on the type of misalignment in the optical receiver strip 14, and this misalignment can be corrected accordingly.

Figure 7:
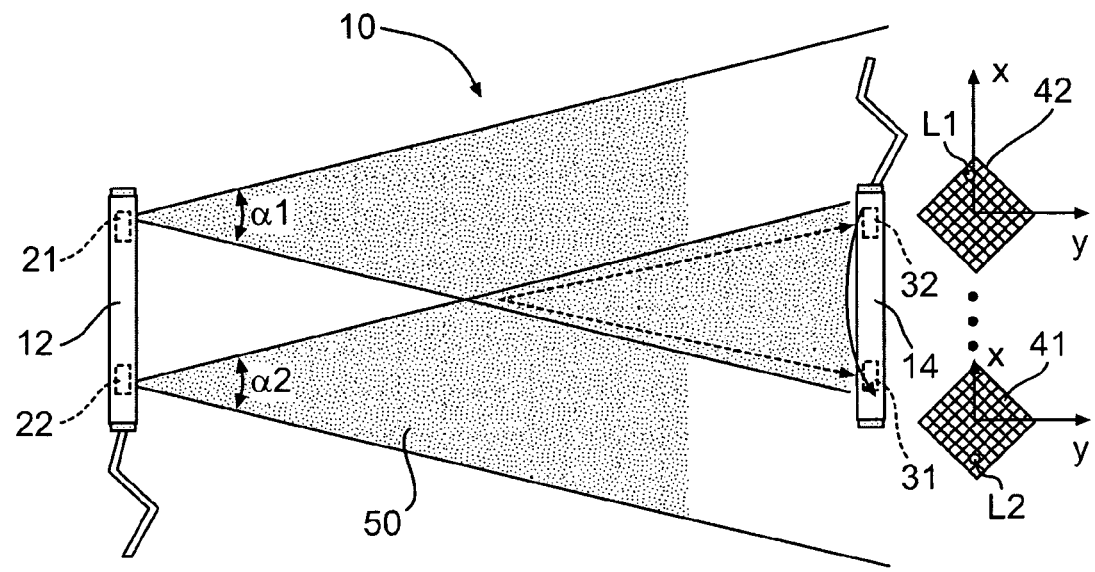

FIG. 7 shows the optoelectronic sensor arrangement 10 of FIG. 3, where the optical receiver strip 14 has been installed upside down. The transmitted cone α1 of optical transmitter 21 does not strike optical receiver 31, but rather optical receiver 32, while the transmitted cone α2 of optical transmitter 22 does not strike optical receiver 32, as desired, but rather optical receiver 31. This kind of reversed installation is revealed by the fact that the optical incident points L1, L2 are displaced in opposite directions along the X-axis. Based on the deviation of incident points L1, L2 from the reference positions shown in FIG. 3, the type of optical receiver strip misalignment relative to optical receiver strip 14 can again identified and corrected accordingly.

As a rule, there is an overlapping of misalignments for a given installation, and these can be reversed in step-by-step fashion by examining the optical incident points L1, L2 on the given spatially-resolving elements 41, 42 in succession. In an initial step, an examination can be made to determine if optical receiver strip 14 has been mounted in twisted fashion relative to the optical transmitter strip 12. In three subsequent steps it is possible to determine if there is a rotational misalignment around the X-, Y-, or Z-axes. As a rule, the sequence in which the individual axes are examined for misalignment lies in the user's discretion.

To increase the reliability of alignment when more than two optical transmitter/receiver pairs are present, any two optical transmitter/receiver pairs can be selected in succession and examined for misalignment.

This aligning process can either be performed on a specific occasion, e.g., only upon installation of the optoelectronic sensor arrangement 10, or on a periodic basis, e.g. every few days or weeks. This will guarantee the correct alignment of the optical transmitter strip 12 relative to the optical receiver strip 14 upon installation, or will provide for an ongoing and regular examination of whether the alignment has been disturbed by jolts or vibrations during operation of the optoelectronic sensor arrangement 10.

Figure 8:
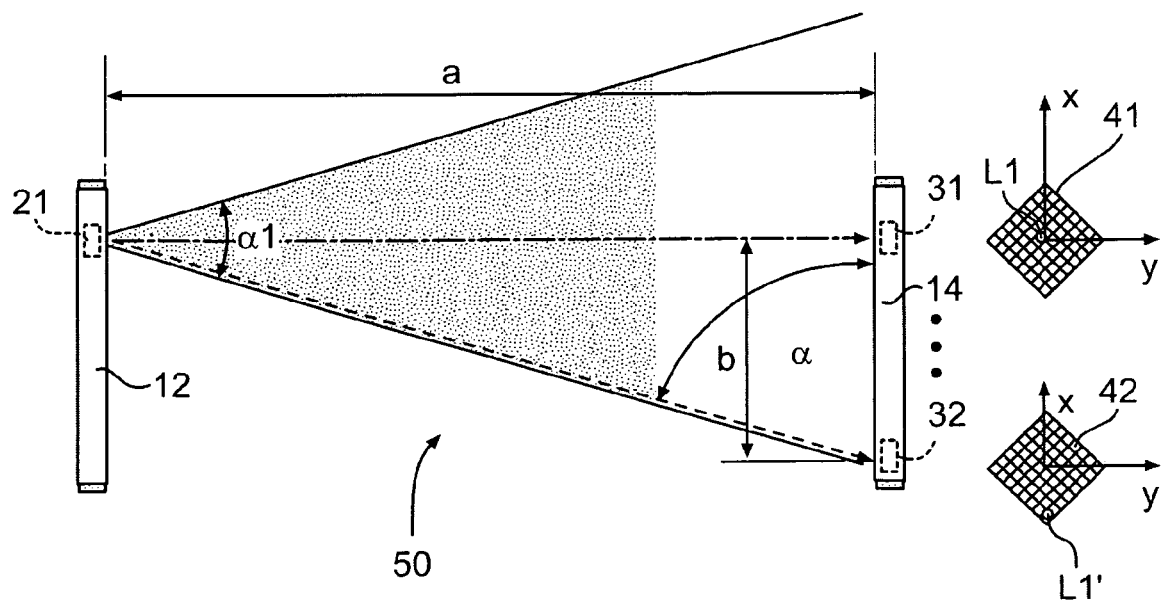

FIG. 8 schematically depicts the process for determining a distance 'a' between optical transmitter strip 12 and optical receiver strip 14. To determine distance 'a', one optical transmitter/receiver pair is required, e.g., optical transmitter 21 and optical receiver 31 (which is referred to as the first optical receiver 31). At the same time, another optical receiver, specifically optical receiver 32 (which is referred to as the second optical receiver 32), is activated. Optical receivers 31, 32 are positioned on the optical receiver strip 14 at a distance 'b' one from the other. Distance 'b' should be such that the transmitted cone α1 of optical transmitter 21 covers both optical receivers 31, 32. The optical transmitter strip 12 and the optical receiver strip 14 are optimally aligned, so that the optical incident point L1 of the cone α1 transmitted by optical transmitter 21 basically strikes the spatially-resolving element 41 of the optical receiver 31 in the center and at an angle of incidence of 90°. However, the light emitted by optical transmitter 21 falls on the optical incident point L1' of the second optical receiver 32 at angle of incidence α. As a result, there is deviation in the X-direction from the position of the incident point that would arise from the optical transmitter 22 corresponding to the second optical receiver 32 given a perpendicular incidence of light, and this incident point constitutes the reference position which would agree with that of incident point L1 on spatially-resolving element 41. The greater the deviation of incident point L1' from the reference position, the smaller is the angle of incidence α of the cone α1 transmitted by optical transmitter 21. The angle of incidence α can be determined from the deviation of the incident point L1' vis-à-vis the reference position and thus from the relative positions of both incident points L1', L1, using a computational projection of both incident points L1', L1 onto a spatially-resolving element. If the angle of incidence α of the cone α1 transmitted by optical transmitter 21 onto the second optical receiver 32 is known, the distance 'a' between the optical transmitter 21 and the first optical receiver 31 can be calculated in the following known manner:

$$a = b \times \tan \alpha.$$

In a simple and known manner it is thus possible to determine the distance 'a' between the optical transmitter 21 and the first optical receiver 31, and thus the distance between optical transmitter strip 12 and optical receiver strip 14, given a correct orientation of the optical transmitter strip 12 relative to the optical receiver strip 14. To determine distance 'a', nothing more is required than an optical transmitter/receiver pair and another optical receiver. To determine the distance 'a' with greater accuracy and provide special reliability, different optical transmitter/receiver pairs operating in temporally staggered fashion will ideally be employed. To increase accuracy, it is also possible to average the values for the distance 'a' obtained for the different optical transmitter/receiver pairs.

Figure 9:
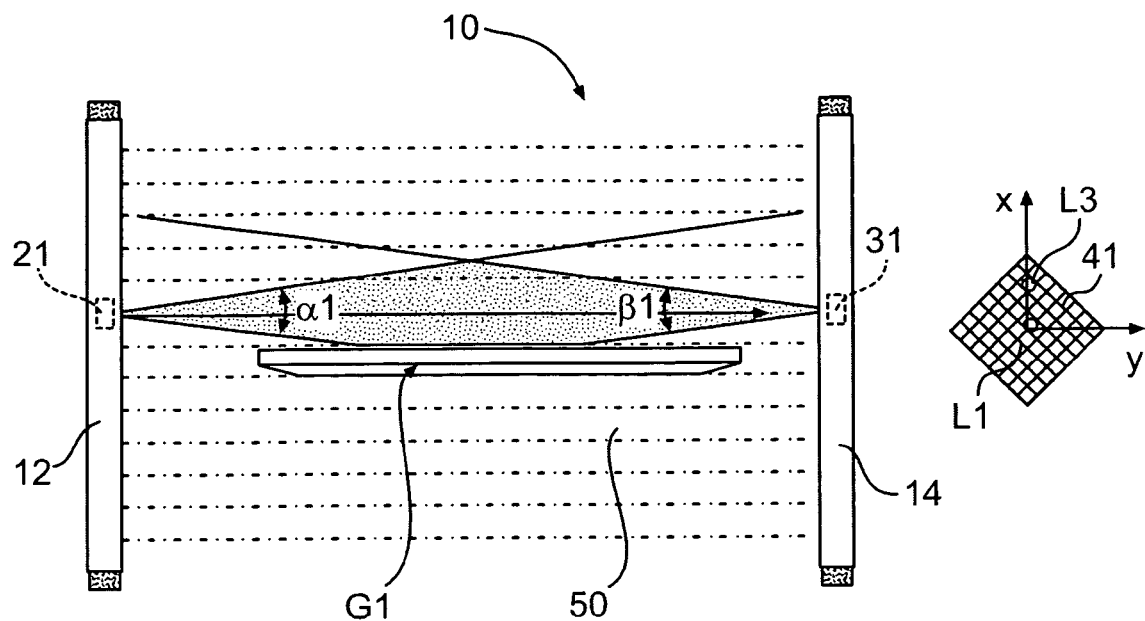
Figure 10:
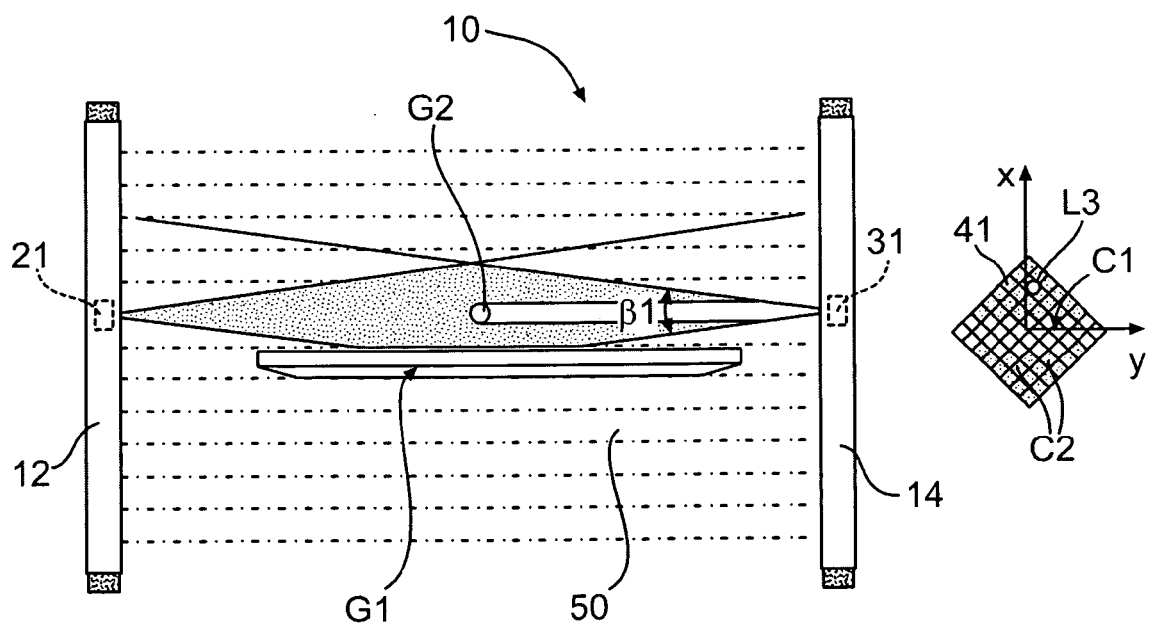

FIGS. 9 and 10 schematically depict the surveillance mode that can be implemented in the surveillance area 50 in order to determine whether objects have permissibly or impermissibly entered the surveillance area.

FIG. 9 shows an object G1 which is located in the surveillance area 50 between The optical transmitter strip 12 and the optical receiver strip 14. The object G1 has a reflective surface, so that, in addition to the direct incident point L1 of the cone α1 transmitted by the optical transmitter 21 onto the spatially-resolving element 41 of the optical receiver 31, another incident point L3 is produced on the spatially-resolving element 41 of the optical receiver 31—inasmuch as the cone α1 transmitted by the optical transmitter 21 is reflected by the surface of the object G1. The two incident points L1, L3 do not coincide. The object G1 thus represents an additional light source whose light strikes the spatially-resolving element 41. The control unit of the sensor arrangement 10 is so designed that light striking a spatially-resolving element 41, 42 from different light sources can be independently detected. For each spatially-resolving element 41, 42 the reference position of the incident point L1 of the corresponding optical transmitter 21, 22 is stored. If the spatially-resolving element 41 detects the incident point L3 as a second incident point, an examination must be made to determine if the incident point is permissible or impermissible. Permissible incident points may be produced, e.g., when the object G1 has entered the surveillance area in permissible fashion—for example, in association with a monitored automation facility or a monitored conveyor belt on which the objects G1 are transported, or when the incidents points are created by additional light sources in the area around the surveillance area 50 which cannot be screened out. Permissible incident points of this kind can be stored in the control unit by means of a teach-in process. If an additional incident point L3 deviates from the reference positions of permissible incident points, it can thus be determined if the object G1, which produces the additional incident point L3, has permissibly entered the surveillance area 50 and or if the entry is an impermissible one. Due to the separate evaluation of the different light sources and thus of the different incident points L1, L3, a high degree of security is guaranteed with respect to objects G1 that have permissibly or impermissibly entered the surveillance area 50.

In addition to the permitted object G1 shown in FIG. 9, FIG. 10 shows an impermissible object G2, which is located in the light path between the optical transmitter 21 and the optical receiver 31. Again detected on the spatially-resolving element 41 is the incident point L3 which is created by the reflection of the cone α1 on the reflective surface of the permitted object G1. The object G2 completely shades the incident point L1 on the spatially-resolving element 41 of the cone α1 projected by optical transmitter 21. Given the absence of incident point L1, which should still be present for the permissible object G1, it can be concluded that incident point L3—indicates the presence an expected target object. In principle, the presence of incident point L3 still might suggest an uninterrupted light path between the optical transmitter 21 and the optical receiver 31; however the presence of incident point L3 combined with the absence of incident point L1 signifies the presence of an object that has impermissibly entered the surveillance area 50. The only detected incident point L3 thus represents a deviation from the expected reference positions of incident points. Based on the positions of the different incident points L1, L3 detected on the spatially-resolving element 41 relative to the reference positions—the position of incident point L3, in the present case—it can thus be determined if the object G1, G2 has permissibly or impermissibly entered the surveillance area 50 or if (as may occur) the light component is from a permissible or impermissible source of foreign light.

It is possible to define areas C1, C3 on the spatially-resolving element 41 such that the position of the incident points L1, L3 in said areas C1, C2 permit a conclusion on whether a permissible or impermissible object is present in the surveillance area 50. These areas C1, C2 can be determined on the basis of a teach-in process. This may be implemented either during the manufacturing process or after the optoelectronic sensor arrangement has been installed at its place of use, in order to take into account not only the incident points of the optical transmitters corresponding to optical receivers 31, 32, but also those foreign light sources present in the vicinity of the surveillance area 50 that might produce a permissible incident point on the spatially-resolving elements 41, 42.

In the present example, the incident point L1 would have to have lie the area C1 in order to indicate that the light path between the optical transmitter 21 and the optical receiver 31 is not interrupted. The position of incident point L3 in area C2, outside of area C1, and the absence of incident point L1 in area C1, show, however, that only an optical reflex from a permissible object G1 within the surveillance area 50 is present, but that this reflex also indicates that the object G2 that has impermissibly entered the surveillance area. In this process also the separate evaluation of the incident points L1, L3 from different light sources provides a reliable statement on whether the objects G1, G2 have permissibly or impermissibly entered the surveillance area 50. This surveillance process is performed at regular intervals, specifically during regular operation of the optoelectronic sensor arrangement 10. Here again different optical transmitter/receiver pairs operating periodically in time-staggered fashion can be employed to determine if objects G1, G2 have permissibly or impermissibly entered the surveillance area 50.

Integrated into the control unit of the optoelectronic sensor arrangement 10 are means that permit both the calculation of distance 'a', as well as the alignment of the optical receiver strip 14 relative to the optical transmitter strip 12 and an examination for the presence of permissible or impermissible reflections and foreign light inputs. Here the different processes may be executed on a periodic basis, or upon specific occasions, for example, upon installation of the optoelectronic sensor arrangement 10 or upon its maintenance.

LIST OF REFERENCE SYMBOLS 10 sensor arrangement
12 optical transmitter strip
14 optical receiver strip
21 optical transmitter
22 optical transmitter
31 optical receiver
31a optical receiver lens
32 optical receiver
41 spatially-resolving element
42 spatially-resolving element
50 surveillance area
L1 optical incident point
L1' optical incident point
L2 optical incident point
L3 optical incident point
G1 object
G2 object
α1 transmitted cone
α2 transmitted cone
β1 received cone
β2 received cone
X axis
Y axis
Z axis
α angle of incidence
a distance
b distance
C1 area
C2 area

The invention claimed is:

1. Optoelectronic sensor arrangement, with a plurality optical transmitters positioned side by side in an optical transmitter strip, such that each transmitter transmits the light of a transmitted cone into a surveillance area, and with a plurality of optical receivers positioned side by side in an optical receiver strip, which receivers receive the light of a received cone from the surveillance area, where each receiver comprises a spatially-resolving element, such that each optical transmitter and optical receiver form one of a plurality of optical receiver/transmitter pairs, further comprising:
a control unit containing means for determining a plurality of optical incident points on one of the optical receivers from a light source, the light source comprising at least one of the transmitted cone of each of the optical transmitters or a foreign light source.

2. Optoelectronic sensor arrangement according to claim 1 wherein
each optical transmitter and each optical receiver can be independently controlled by the control unit.

3. Optoelectronic sensor arrangement according to claim 1, wherein
the spatially-resolving element consists of a matrix configuration composed of a plurality of photosensitive elements.

4. Optoelectronic sensor arrangement according to claim 1, wherein
said control unit has means for implementing a distance-calculating mode, in which at least one of the optical incident points of the transmitted cone of that optical transmitter which forms an optical transmitter/receiver pair with a first one of the plurality of optical receivers is determined, such that an angle of incidence on a second one of the plurality of optical receivers is determined from relative positions of said least one of the optical incident points on both the optical receivers, and where a distance between the first optical receiver and the corresponding optical transmitter is calculated from the angle of incidence and a second distance between the two optical receivers.

5. Optoelectronic sensor arrangement according to claim 1, wherein
said control unit has means for implementing an alignment mode, in which at least one of the optical incident points of the transmitted cone of the optical transmitter on the corresponding optical receiver is determined for two of the optical transmitter/receiver pairs, such that a conclusion about a type of misalignment is drawn from the positions of said least one of the optical incident points on the optical receivers relative to a reference position that represents the optimal alignment.

6. Optoelectronic sensor arrangement according to claim 1, wherein
said control unit has means for implementing a surveillance mode, in which at least one of the optical incident points of the transmitted cone of the optical transmitter on the corresponding optical receiver is determined for each optical transmitter/receiver pair, and an examination is made to determine if another optical incident point is produced on said corresponding optical receiver by a reflection or by foreign light, such that, if a second incident point is present on the optical receiver, a conclusion can be drawn on whether a permissible or impermissible reflection or input of foreign light is present, as based on the positions of at least a subset of the optical incident points on the optical receiver, relative to predetermined reference positions.

7. A process for monitoring a surveillance area, with a plurality optical transmitters positioned side by side in an optical transmitter strip, such that each optical transmitter transmits the light of a transmitted cone into a surveillance area, and with a plurality of optical receivers positioned side by side in an optical receiver strip, which receivers receive the light of a received cone from the surveillance area, such that each receiver comprises a spatially-resolving element and each optical transmitter and optical receiver form one of a plurality of optical receiver/transmitter pairs,
wherein,
for the first and second optical receiver, a distance-calculating mode determines at least one optical incident points of the transmitted cone of that optical transmitter which forms an optical transmitter/receiver pair with a first one of the plurality of optical receivers, and the angle of incidence on a second one of the plurality of optical receivers is determined from the relative positions of optical incident points on both optical receivers, and a distance between the first optical receiver and the corresponding optical transmitter is calculated from the angle of incidence and a second distance between the two optical receivers.

8. Process according to claim 7,
wherein
the distance-calculating mode employs different optical transmitter/receiver pairs whose operation is staggered in time one relative to the other.

9. A process for monitoring a surveillance area, with a plurality optical transmitters positioned side by side in an optical transmitter strip, such that each transmitter transmits the light of a transmitted cone into a surveillance area, and with a plurality of optical receivers positioned side by side in an optical receiver strip, which receivers receive the light of a received cone from the surveillance area, such that each receiver comprises a spatially-resolving element and each optical transmitter and optical receiver form one of a plurality of optical receiver/transmitter pairs,
wherein
an alignment mode determines one of a plurality of optical incident points of the transmitted cone of the optical transmitter on the corresponding optical receiver, the optical incident points determined for two of the optical transmitter/receiver pairs, such that a conclusion about the type of misalignment is drawn from the positions of the optical incident points on the two optical receivers relative to a reference position that represents an optimal alignment.

10. Process according to claim 9,
wherein
an X-axis is defined by the optical transmitters positioned side by side, a Z-axis is defined by a symmetrical axis of the transmitted cone, and a Y-axis runs perpendicular to the X-axis and to the Y-axis, and it can be concluded that the optical receiver strip has been improperly twisted around the Y-axis when there is a deviation in the optical incident points of both light cones of the optical transmitters in the same direction along the X-axis, relative to the reference positions, and it can be concluded that the optical receiver strip has been improperly twisted around the Z-axis when there is deviation in the optical incident points of both corresponding to both of the light cones of the optical transmitters in opposite directions along the Y-axis, relative to the reference positions, and it can be concluded that the optical receiver strip was improperly twisted upon installation when there is a deviation in the optical incident points of both light cones of the optical transmitters in opposite directions along the X-axis.

11. Process according to claim 9, wherein different optical transmitter/receivers pairs whose operation is staggered in time one relative to the other are employed in the alignment mode for determining misalignments.

12. Process according to claim 9, wherein the reference positions can be determined by means of a teach-in process.

13. Process for monitoring a surveillance area, with a plurality optical transmitters positioned side by side in an optical transmitter strip, such that each transmitter sends the light of a transmitted cone into a surveillance area, and with a plurality of optical receivers positioned side by side in an optical receiver strip, which optical receivers receive the light of a received cone from the surveillance area, such that each receiver comprises a spatially-resolving element and each optical transmitter and optical receiver form one of a plurality of optical receiver/transmitter pairs, wherein a surveillance mode is implemented in which an optical incident point of the transmitted cone of the optical transmitter on the corresponding optical receiver is determined for each optical transmitter/receiver pair, and an examination is made to determine if a second optical incident point is produced on said corresponding optical receiver by a reflection or by foreign light, such that, said second optical second incident point is present on the optical receiver, a conclusion can be drawn on whether a permissible or impermissible reflection or input of foreign light is present, as based on the positions of the optical incident points on the optical receiver relative to predetermined reference positions.

14. Process according to claim 13, wherein different optical transmitter/receivers pairs whose operation is staggered in time relative to each other are employed in the surveillance mode for determining the presence of a permissible or impermissible reflection or input of foreign light.

15. Process according to claim 13 wherein the reference positions can be determined by means of a teach-in process.

16. Process for monitoring a surveillance area according to claim 7, in which the distance-calculating mode is activated on a periodic or an occasion-specific basis.

17. Process for monitoring a surveillance area according to claim 9, in which the alignment mode is activated on a periodic or an occasion-specific basis.

18. Process for monitoring a surveillance area according to claim 12, in which the surveillance mode is activated on a periodic or an occasion-specific basis.

19. Optoelectronic sensor arrangement according to claim 3, wherein the matrix configuration composed of a plurality of photosensitive elements, comprise a CCD sensor or a CMOS image-processing sensor.

\* \* \* \* \*